(12) United States Patent
Natori

(10) Patent No.: US 8,687,218 B2
(45) Date of Patent: Apr. 1, 2014

(54) PRINTING SYSTEM, DEVICE MANAGEMENT SERVER, INFORMATION PROCESSING METHOD, AND STORAGE MEDIUM FOR CREATING A SCREEN FOR SETTING PRINT SETTING INFORMATION ABOUT A FUNCTION BASED ON PRINTING DEVICE CONFIGURATION DATA AND PRINT SETTING DATA

(75) Inventor: Takuya Natori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/184,355

(22) Filed: Jul. 15, 2011

(65) Prior Publication Data

US 2012/0019859 A1 Jan. 26, 2012

(30) Foreign Application Priority Data

Jul. 20, 2010 (JP) ................................ 2010-163239

(51) Int. Cl.
  *G06F 3/12* (2006.01)
(52) U.S. Cl.
  USPC ....................................................... 358/1.15
(58) Field of Classification Search
  USPC ....................................................... 358/1.15
  See application file for complete search history.

(56) References Cited

U.S. PATENT DOCUMENTS

2008/0186532 A1 * 8/2008 Ogasawara ................... 358/1.15
2009/0225366 A1 * 9/2009 Emori ........................... 358/1.15

FOREIGN PATENT DOCUMENTS

JP 2006-163993 A 6/2006

* cited by examiner

*Primary Examiner* — Qian Yang
(74) *Attorney, Agent, or Firm* — Canon USA Inc. IP Division

(57) ABSTRACT

When a print server apparatus receives a service utilization request that includes setting identification information, printing device identification information, and service provision unit identification information, the print server apparatus transmits to a device management server apparatus print setting data identified based on the setting identification information, the printing device identification information, and location information indicating a location of the service provision unit identified based on the service provision unit identification information. The device management server apparatus creates a screen for setting print setting information of a function that can be executed by the printing device based on configuration data about the printing device identified based on the printing device identification information and the print setting data, associates the location information with a predetermined object included in the screen, and transmits the screen.

5 Claims, 20 Drawing Sheets

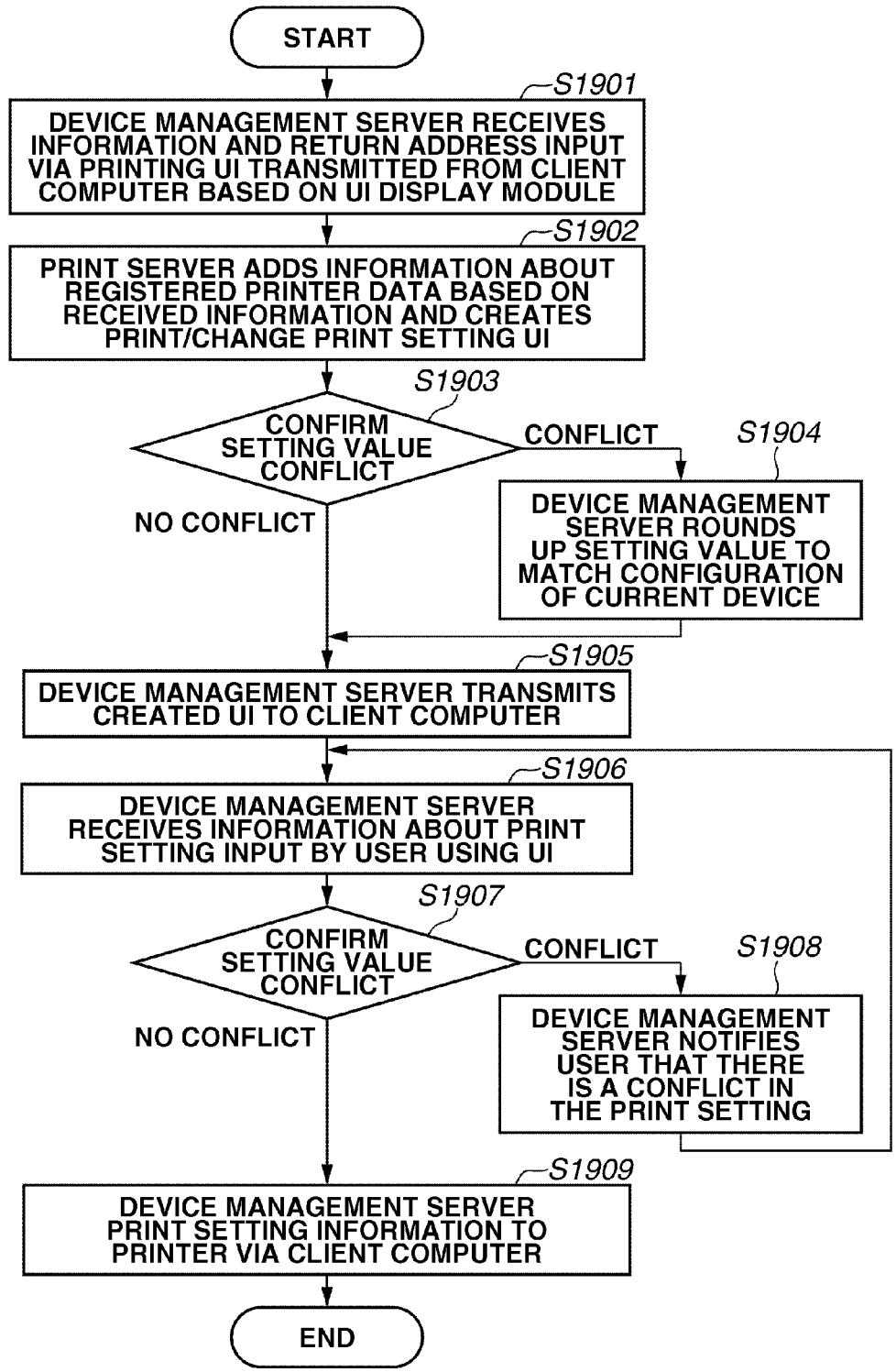

PRINTING SYSTEM, DEVICE MANAGEMENT SERVER, INFORMATION PROCESSING METHOD, AND STORAGE MEDIUM FOR CREATING A SCREEN FOR SETTING PRINT SETTING INFORMATION ABOUT A FUNCTION BASED ON PRINTING DEVICE CONFIGURATION DATA AND PRINT SETTING DATA

BACKGROUND OF THE INVENTION

1. Field of the Invention

The present invention relates to a printing system, a device management server apparatus, an information processing method, and a storage medium.

2. Description of the Related Art

When performing printing using a target image forming apparatus with a printing system in which printing processing is performed based on communication between an information processing apparatus and an image forming apparatus via a network, it has been necessary to pre-install in the information processing apparatus a driver corresponding to the target image forming apparatus.

In view of the complex settings that are required for some target image forming apparatuses when installing a driver, Japanese Patent Application Laid-Open No. 2006-163993 discusses a technique for realizing printing via a server apparatus that is on a network without installing a driver in the information processing apparatus.

According to this technique, printing can be realized without installing a driver in the information processing apparatus by communication between the information processing apparatus and a server apparatus that includes a driver corresponding to the target image forming apparatus.

However, if information relating to the configuration of the target image forming apparatus is not stored in the server apparatus, it may be impossible to provide the information processing apparatus with a user interface (UI) for setting the appropriate print setting information.

SUMMARY OF THE INVENTION

The present invention is directed to a printing system, a device management server apparatus, and an information processing method, which are capable of, even when configuration data relating to the configuration of a printing device is not stored, providing a client apparatus with a screen for setting appropriate print setting information based on the configuration data.

According to an aspect of the present invention, a printing system including a print server apparatus having a plurality of service provision units configured to provide printing-related services and a device management server apparatus configured to manage configuration data relating to a configuration of a plurality of printing devices, wherein the print server apparatus is configured to, when the print server apparatus receives a service utilization request from a client apparatus that includes setting identification information that identifies print setting data, printing device identification information that identifies a printing device, and service provision unit identification information that identifies a service provision unit, transmit to the device management server apparatus print setting data identified based on the setting identification information, the printing device identification information, and location information indicating a location of the service provision unit identified based on the service provision unit identification information, and wherein the device management server apparatus is configured to, when the device management server apparatus receives the print setting data, the printing device identification information, and the location information from the print server apparatus, create a screen for setting print setting information of a function that can be executed by the printing device based on configuration data about the printing device identified based on the printing device identification information and the print setting data, associate the location information with a predetermined object included in the screen, and transmit the screen to the client apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 20 is a flowchart illustrating an example of processing performed by the device management server according to the fourth exemplary embodiment.

DESCRIPTION OF THE EMBODIMENTS

Various exemplary embodiments, features, and aspects of the invention will be described in detail below with reference to the drawings.

<System Configuration>

Figure 1:
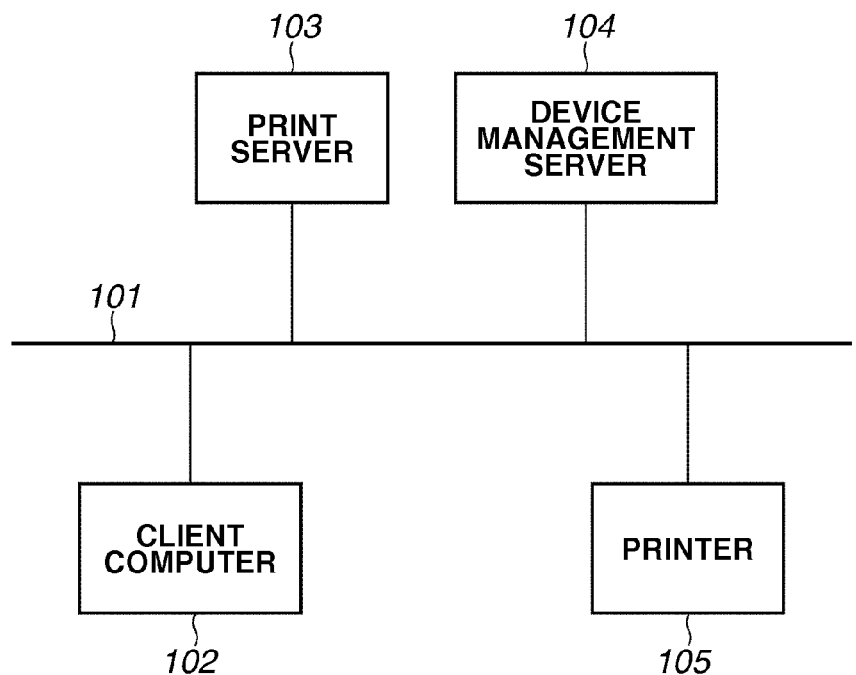
FIG. 1 illustrates an example of a printing system configuration.

FIG. 1 illustrates an example of a printing system configuration. A client computer 102, a print server 103, a device management server 104, and a printer 105 are connected to a network 101. The printer 105 is an example of an image forming apparatus or a printing device. Although FIG. 1 illustrates a configuration in which only one printer 105 is connected to the network 101 in order to simplify the description, a plurality of printers can be connected to the network 101.

Although the client computer 102 has a web browsing function, a printer driver corresponding to the printer 105 is not installed in the client computer 102. The client computer 102 can communicate with the print server 103, the device management server 104, and the printer 105 via the network 101.

The print server 103 provides printing-related services. The print server 103 stores information (user data) about users who are utilizing the services, and information (a registered printer list) about the printers that execute printing processing relating to the services. Examples of printing-related services include management of print data and issuance of a print instruction to a printer. The print server 103 is an example of a print server apparatus.

The device management server 104 manages device configuration information (registered printer data) and device-specific information about the printer 105 connected to the network 101. The device management server 104 is an example of a device management server apparatus.

<Server Hardware Configuration>

Figure 2:
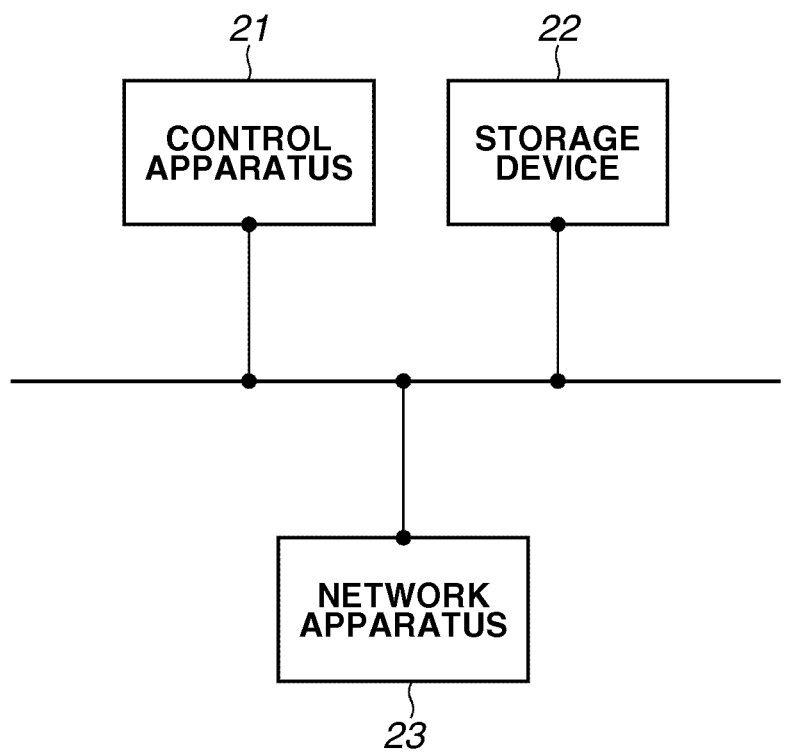
FIG. 2 illustrates an example of a hardware configuration of a server, such as a print server and a device management server.

FIG. 2 illustrates an example of a hardware configuration of the print server 103 and the device management server 104.

A control apparatus 21 is, for example, a central processing unit (CPU) that executes the function configuration (module) of each of the below-described servers and the processing illustrated in the following flowcharts, by executing processing based on a program stored in a storage device 22. The storage device 22 is a storage device such as a read-only memory (ROM), a random access memory (RAM), or a hard disk drive (HDD), which stores the programs and data (or information) used when the control apparatus 21 realizes processing based on the programs. A network apparatus 23 is an interface which connects the servers to the network 101.

<Print Server Configuration>

Figure 3:
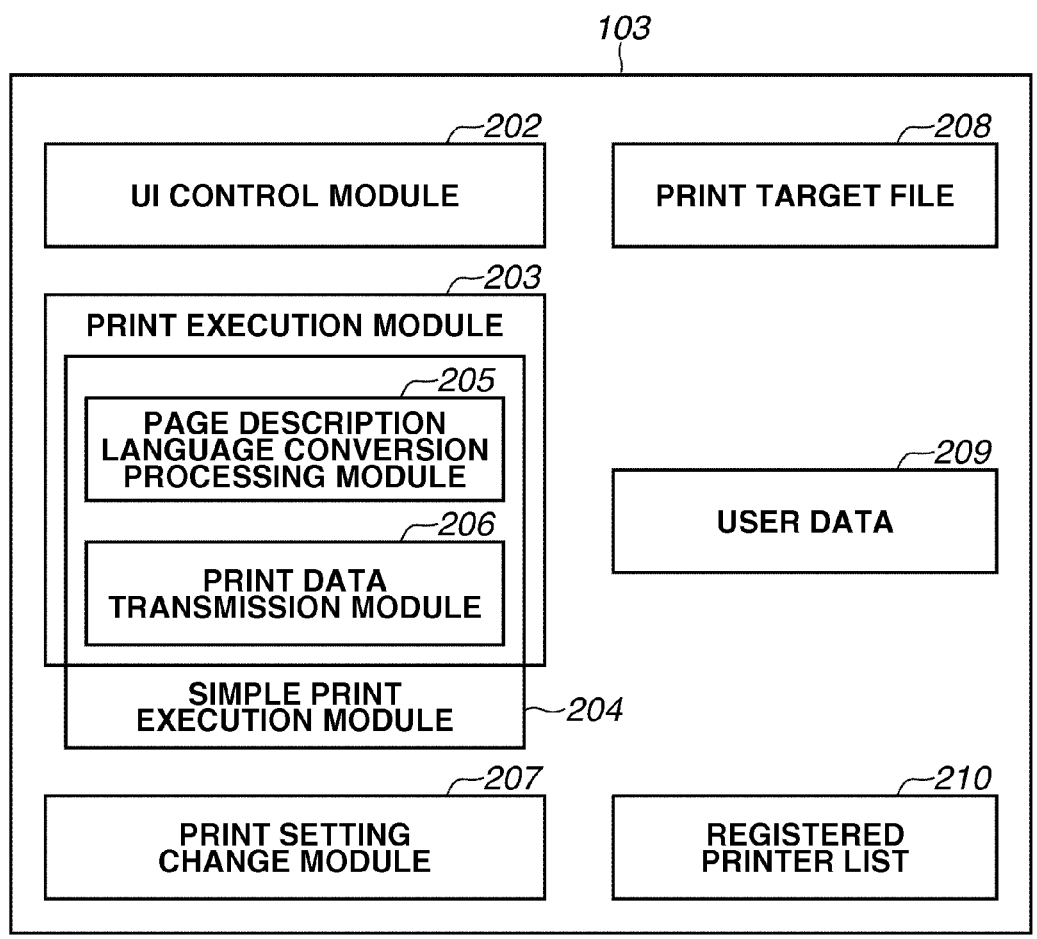
FIG. 3 illustrates an example of a module and data configuration in a print server.

The print server 103 is configured from the modules and data illustrated in FIG. 3, which is an example of the configuration of the modules and data in the print server 103.

The print server 103 includes a UI control module 202, a print execution module 203, a simple print execution module 204, a page description language conversion processing module 205, a print data transmission module 206, and a print setting change module 207.

The print execution module 203 and the print setting change module 207 are an example of a service provision unit which provides a printing-related service. Further, the print server 103 stores a print target file 208, user data 209, and a registered printer list 210. These data are stored in the storage device 22.

Figure 4:
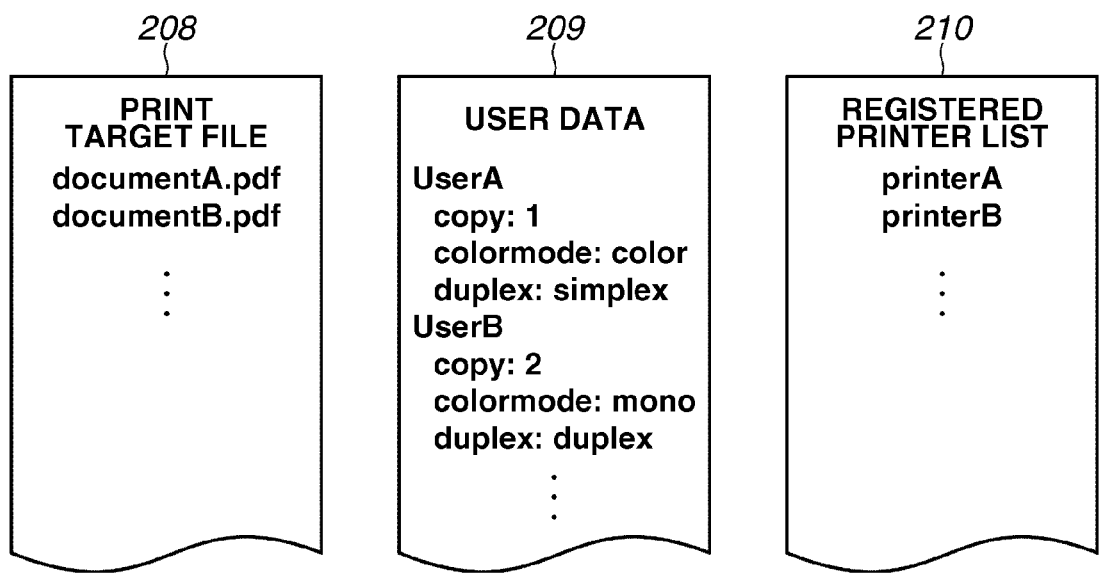
FIG. 4 illustrates an example of print data, user data, and a registered printer list.

FIG. 4 illustrates an example of print data, user data, and a registered printer list. Further, depending on the functions of the print server, the server may be configured from other modules and data. Moreover, when realizing the same function by cooperating with another service, modules and data, such as those illustrated in FIG. 3, do not necessarily have to be included.

Examples of the main functions of the print server 103 are a printing function that enables a user to output desired print data using a desired printer, and a setting change function that enables the user to register desired print setting information.

<Device Management Server Configuration>

Figure 5:
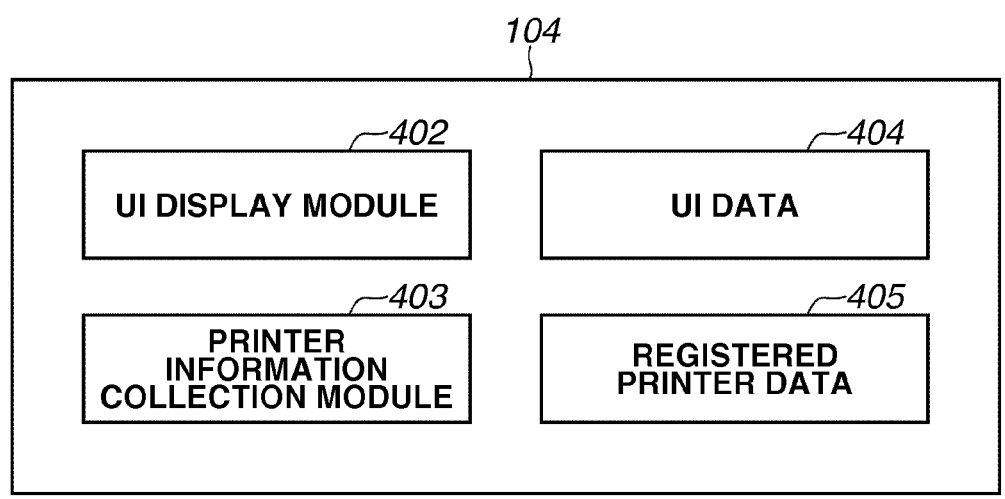
FIG. 5 illustrates an example of a module and data configuration in a device management server.

The device management server is configured from the modules and data illustrated in FIG. 5, which is an example of the configuration of the modules and data in the device management server 104.

The device management server 104 includes a UI display module 402, a printer information collection module 403, UI data 404, and registered printer data 405. The printer information collection module 403 operates independently of the printing and print setting change sequences.

Figure 6:
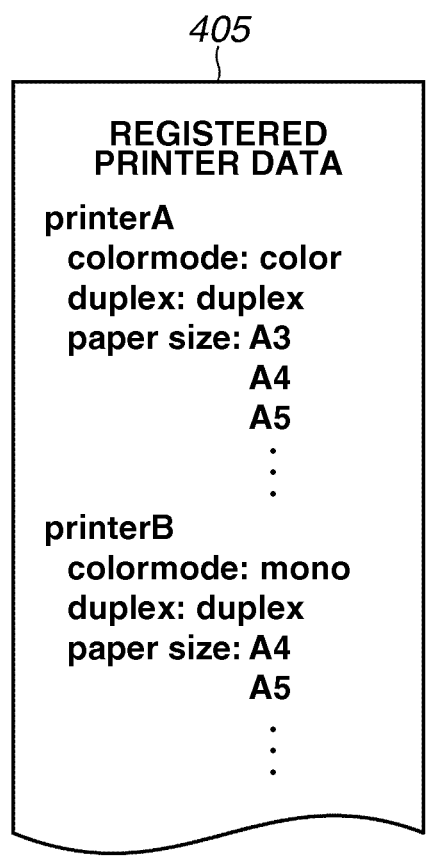
FIG. 6 illustrates an example of registered printer data.

FIG. 6 illustrates an example of the registered printer data 405. Further, depending on the functions of the device management server, the server may be configured from other modules and data. Moreover, when realizing the same function by cooperating with another service, the modules and data illustrated in FIG. 5 do not necessarily have to be included. The registered printer data 405 includes information relating to the functions (configuration) included in the printing device.

Examples of the main functions of the device management server 104 include a printer information acquisition function performed by operating the printer information collection module 403 periodically or continually, and a UI display function for displaying the UI on the client computer.

<Printing Procedure>

Figure 7:
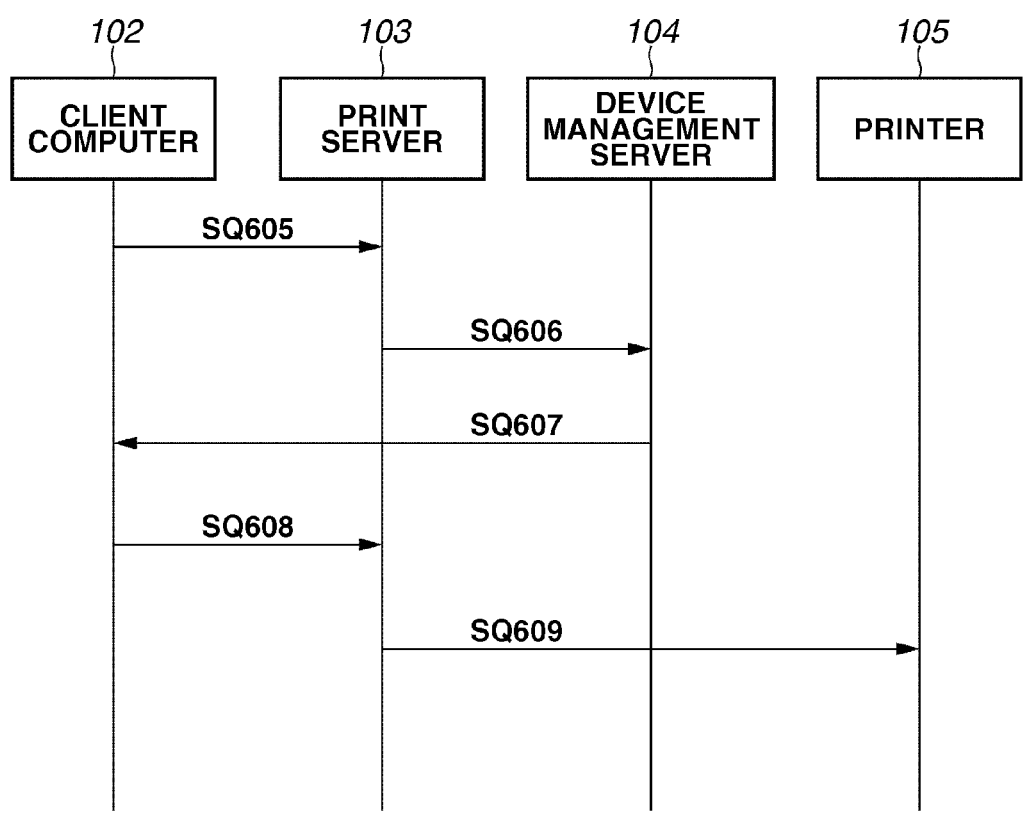
FIG. 7 illustrates an example of a printing processing sequence according to a first exemplary embodiment.

A sequence in which printing is performed in a printing system by the user using a client computer is illustrated in FIG. 7, which is an example of the printing processing sequence according to the first exemplary embodiment.

Before the processing in FIG. 7 starts, the user logs in to the print server 103 from the client computer 102. Based on information about the logged in user, the print server can specify the user data (print setting information) to be used in this processing from the user data, which is an example of the print setting data for each user. More specifically, the information about the logged in user serves as setting identification information.

Figure 8:
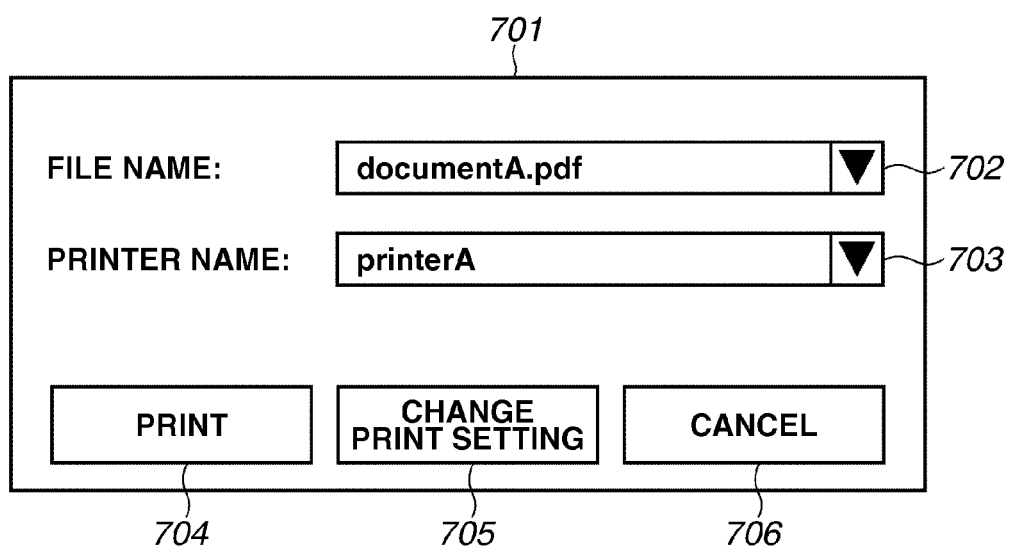
FIG. 8 illustrates an example of a screen displayed by a UI control module according to the first exemplary embodiment.

When the client computer 102 accesses the print server 103, the UI control module 202 in the print server 103 presents the UI (screen) illustrated in FIG. 8 on the client computer 102. FIG. 8 illustrates an example of a screen displayed by the UI control module 202 according to the first exemplary embodiment.

Then, the user selects the file to be printed from the print target file (702 in FIG. 8), selects the target printer from the registered printer list (703 in FIG. 8), and presses the print button 704. Consequently, in SQ605, the client computer 102 transmits a service utilization request including the information to the print server 103.

The information transmitted in SQ605 includes information identifying the print target file and printer identification information, which is an example of printing device identification information that identifies the printer. In addition, the SQ605 information includes module identification information, which is an example of service provision unit identification information that identifies the modules in the print server 103.

Next, in SQ606, the print server 103 transmits user data about the logged in target user, the print target file, information about the target printer 105, and a return address indicating the address of the print execution module, to the device management server 104. More specifically, based on information about the logged in user, the print server 103 acquires the user data corresponding to the logged in user from the user data 209.

Further, based on information identifying the print target file, the print server 103 acquires the print target file corresponding to this information from the print target file 208. The print server 103 transmits the acquired user data, the print target file, the printer identification information, and the return address indicating the address of the print execution module 203 identified based on the module identification information to the device management server 104.

The module address is an example of location information indicating the location of the module.

Figure 9:
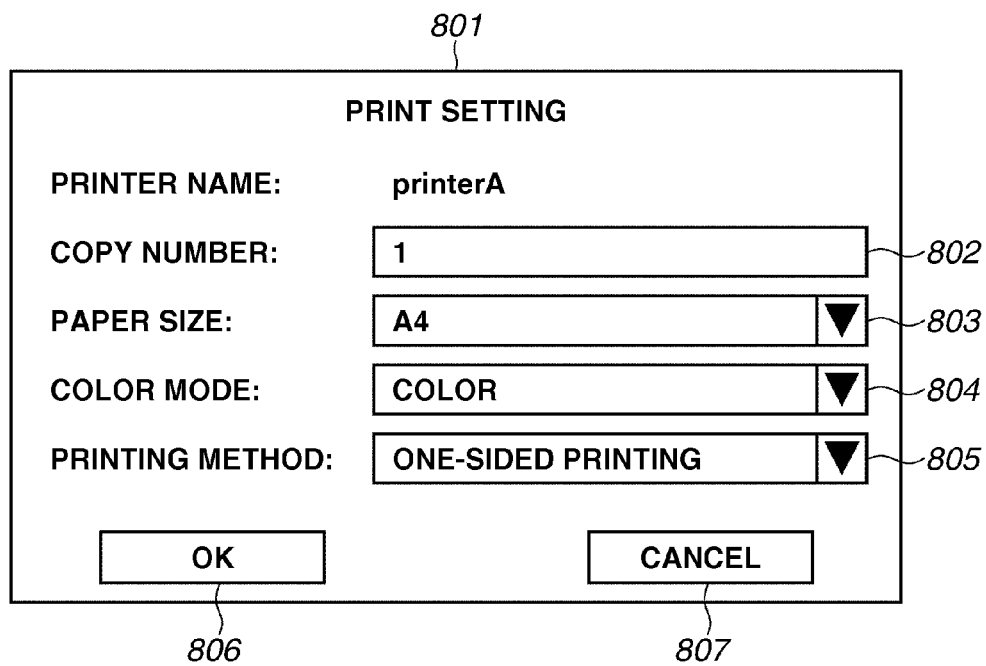
FIG. 9 illustrates an example of a print setting screen displayed by a UI display module.

When the UI display module 402 in the device management server 104 receives the information transmitted from the print server 103, based on the received information, the UI display module 402 adds information relating to the target printer 105 from the registered printer data 405, and creates the UI illustrated in FIG. 9, which is an example of a print setting screen created by the UI control module 402.

Then, in SQ607, the UI display module 402 presents the UI on the client computer 102. As the settings in the created UI, the UI display module 402 excludes setting values that cannot be realized by the target printer 105.

If the user data is inappropriate for the registered printer data, the UI display module 402 changes the setting value as appropriate to a setting value that can be executed by the target printer. Consequently, a setting value conflict that could not be realized by the target printer 105 is resolved. In addition, the UI display module 402 associates the return address transmitted from the print server 103 with an OK button 806.

More specifically, the UI display module 402 acquires from the registered printer data 405 the configuration data of the printer identified based on the printer identification information included in the information transmitted from the print server 103.

Then, based on the user data included in the information transmitted from the print server 103 and the above configuration data, the UI display module 402 creates a screen that enables the print setting information about the functions which can be executed by the target printer to be set from among the print setting information indicated by the user data.

In addition, the UI display module 402 associates the return address transmitted from the print server 103 with the OK button 806, which is an example of a predetermined object included in the screen. The UI display module 402 transmits the created screen to the client computer 102. Further, the OK button 806 is an example of a button for activating the print setting information on the screen.

In SQ608, based on the presented UI, the user sets the print setting information, presses the OK button, and then the client computer 102 transmits the print setting information to the print server 103.

The print server 103 executes the module corresponding to the return address transmitted from the client computer 102. In this case, since a return address indicating the print execution module 203 is transmitted, the print server 103 executes the print execution module 203.

Based on the print setting information transmitted from the client computer 102, the print execution module 203 in the print server 103 converts the print target file and the print setting information into a page description language that can be interpreted by the printer 105 via the page description language conversion module. Consequently, print data is generated. Then, in SQ609, the print execution module 203 transmits the print data converted into a page description language to the target printer via the print data transmission module.

Then, the printer 105 interprets and outputs the transmitted print data.

<Print Setting Change Procedure>

Figure 10:
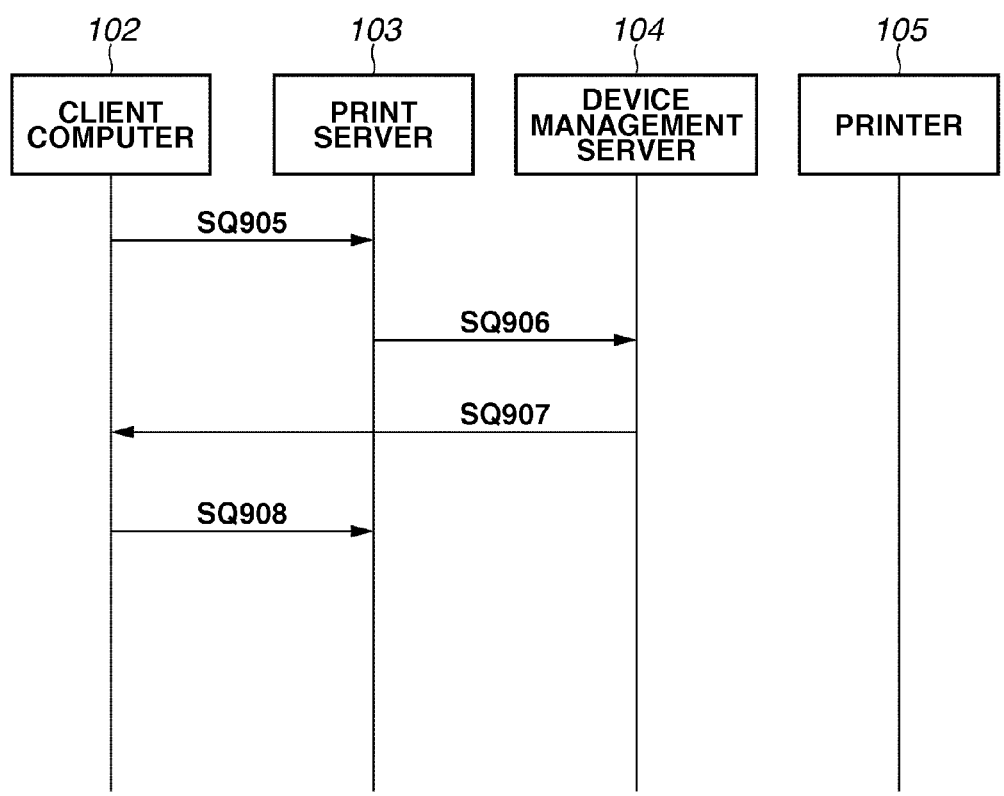
FIG. 10 illustrates an example of a print setting change processing sequence.

A sequence diagram illustrating an example in which the user sets print setting information in a printing system by using the client computer 102 is illustrated in FIG. 10. Before the processing in FIG. 10 starts, the user logs in to the print server 103 from the client computer 102.

When the client computer 102 accesses the print server 103, the UI control module 202 in the print server 103 presents the UI illustrated in FIG. 8 on the client computer 102. Then, the user selects the target printer from the registered printer list, and presses a print setting change button 705. Consequently, in SQ905, the client computer 102 transmits the information to the print server 103.

When changing the print setting, the data to be printed does not have to be selected from the print data target file. The information transmitted in SQ905 includes printer identification information, which is an example of printing device identification information that identifies the printer. In addition, this information includes module identification information, which is an example of service provision unit identification information that identifies the modules in the print server 103.

Next, in SQ906, the print server 103 transmits user data about the logged in target user, information about the target printer 105, and a return address indicating the address of the print setting change module, to the device management server 104. More specifically, based on information about the logged in user, the print server 103 acquires the user data corresponding to the logged in user from the user data 209.

The print server 103 transmits the acquired user data, the printer identification information, and the return address indicating the address of the print setting change module 207 identified based on the module identification information, to the device management server 104.

Based on the information transmitted from the print server 103, the UI display module 402 in the device management server 104 adds the information relating to the target printer 105 from the registered printer data 405, and creates the UI illustrated in FIG. 9. Then, in SQ907, the UI display module 402 presents the created UI on the client computer 102.

As the settings in the created UI, the UI display module 402 excludes setting values that cannot be realized by the target printer 105. If the user data is inappropriate for the registered printer data, the UI display module 402 changes the setting value as appropriate to a setting value that can be executed by the target printer.

Consequently, a setting value conflict that could not be realized by the target printer 105 is resolved. In addition, the UI display module 402 associates the return address transmitted from the print server 103 with the OK button 806.

In SQ908, based on the presented UI illustrated in FIG. 9, the user sets the print setting information, presses the OK button 806, and then the client computer 102 transmits the print setting information to the print server 103.

The print server 103 executes the module corresponding to the return address transmitted from the client computer 102.

In this case, since a return address indicating the print setting change module 207 is transmitted, the print server 103 executes the print setting change module 207.

The print setting change module 207 in the print server 103 updates the user data setting value based on the print setting information transmitted from the client computer 102.

<When Performing a Redirect by the Client Computer>

Depending on the network environment, in some cases direct communication between the print server 103 and the device management server 104, or print data transmission from the print server 103 to the printer 105, can be difficult.

Figure 11:
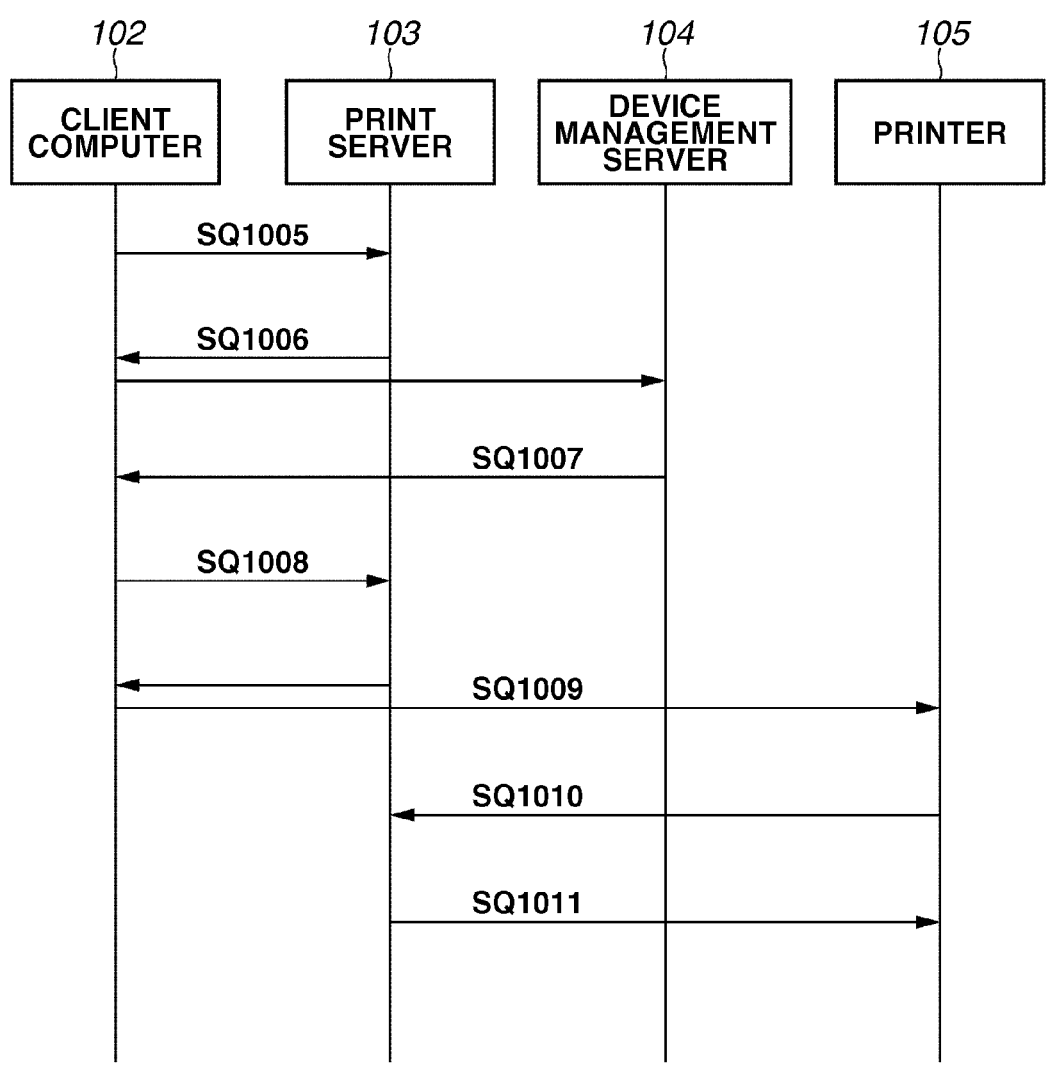
FIG. 11 illustrates an example of a sequence during a redirect.
Figure 12:
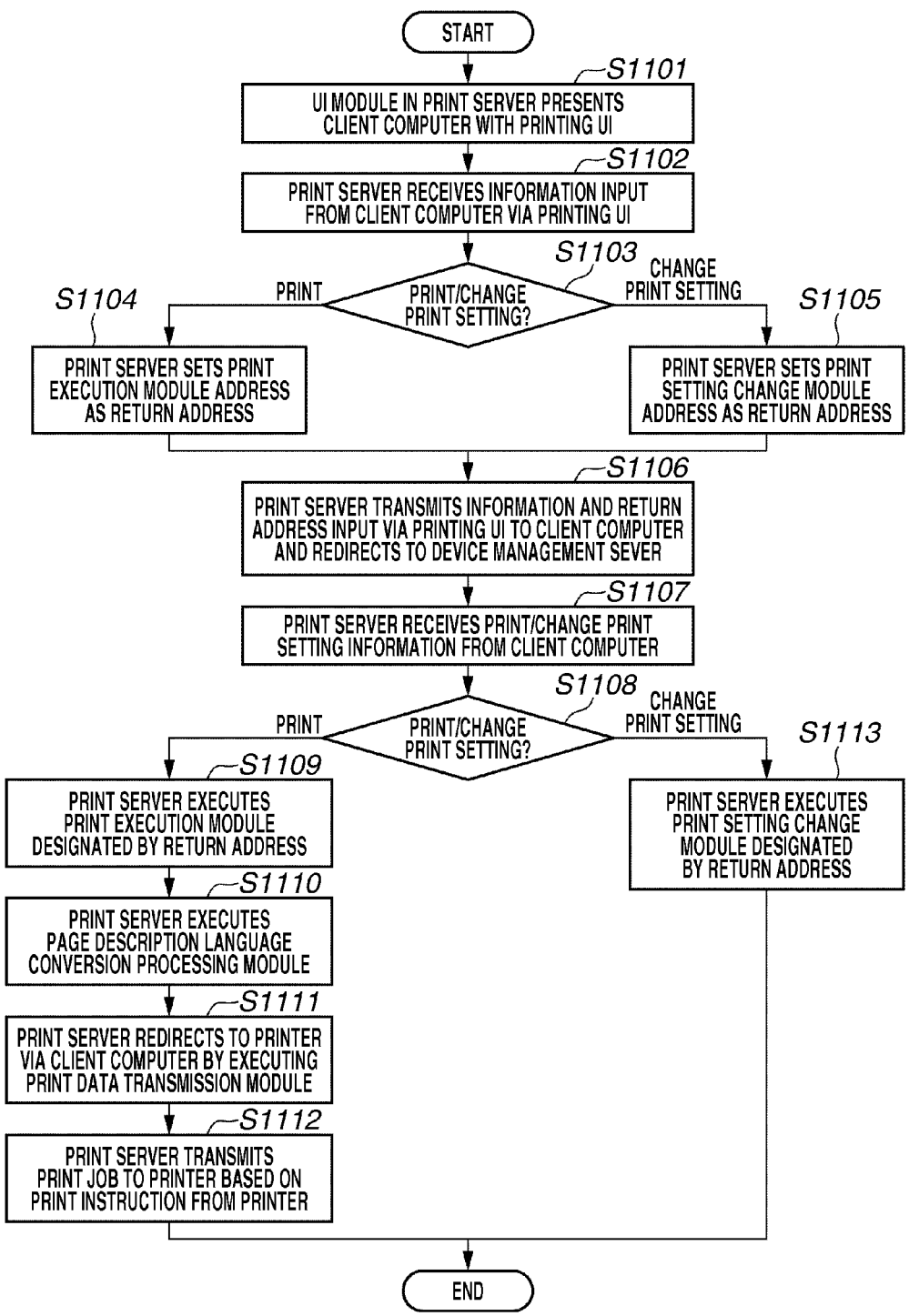
FIG. 12 is a flowchart illustrating an example of processing performed by a print server during a redirect according to the first exemplary embodiment.
Figure 13:
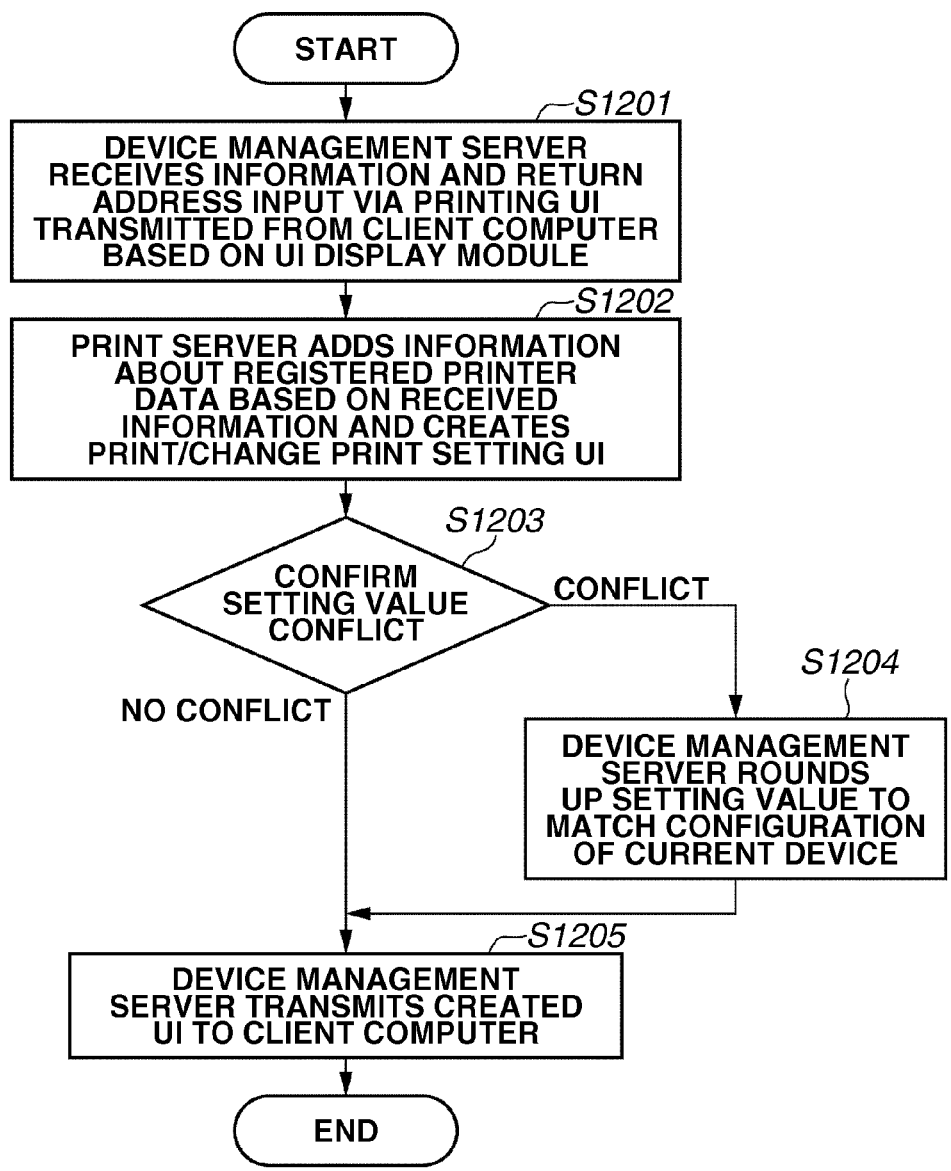
FIG. 13 is a flowchart illustrating an example of processing performed by the device management server according to the first exemplary embodiment.

A sequence in which the above-described printing is performed and the print setting information is set in such an environment is illustrated in FIG. 11. Further, relating to this procedure, a flow of the processing performed by the print server is illustrated in FIG. 12, and a flow of the processing performed by the device management server is illustrated in FIG. 13.

FIG. 11 illustrates an example of a sequence during a redirect. FIG. 12 is a flowchart illustrating an example of the processing performed by the print server 103 during a redirect according to the first exemplary embodiment. FIG. 13 is a flowchart illustrating an example of the processing performed by the device management server 104 according to the first exemplary embodiment.

In step S1101, when the client computer 102 accesses the print server 103, the UI control module 202 in the print server 103 presents the UI illustrated in FIG. 8 on the client computer 102.

Then, the user selects the file (data) to be printed from the print target file, selects the target printer from the registered printer list, and presses the print button 704 or the print setting change button 705. Consequently, in SQ1005, the client computer 102 transmits a service utilization request including the information, to the print server 103.

If the print button 704 is pressed, the client computer 102 transmits a print request including information identifying the print execution module 203 as the service utilization request.

If the print setting change button 705 is pressed, the client computer 102 transmits a print setting change request including information identifying the print setting change module 207 as the service utilization request. In step S1102, the print server 103 receives this information.

Next, in step S1103, the print server 103 determines whether the print button 704 or the print setting change button 705 is pressed, and in steps S1104/S1105, sets the appropriate module address as the return address. Then, in step S1106, the print server 103 transmits information including information about the logged in user data, the print target file, information about the target printer 105, and the return address indicating the address of the print execution module or the print setting change module, to the client computer.

Then, in SQ1006, the print server 103 indirectly transmits the above information to the device management server 104 by redirecting so that the information is transmitted to the device management server 104 by the client computer 102. In step S1201, the device management server 104 receives the transmitted information.

In step S1202, based on the information transmitted from the client computer 102, the UI display module 402 in the device management server 104 adds the information relating to the target printer 105 from the registered printer data 405, and creates the UI illustrated in FIG. 9. As the setting values in the created UI, the UI display module 402 excludes setting values that cannot be realized by the target printer 105.

In step S1203, the UI display module 402 determines whether the user data is appropriate (suitable) for the registered printer data. If it is determined that the user data is inappropriate (unsuitable) (CONFLICT in step S1203), in step S1204, the UI display module appropriately changes the setting value that cannot be realized by the target printer to a setting value that can be realized by the target printer.

Consequently, the setting value conflict that could not be realized by the target printer 105 is resolved. In addition, the UI display module 402 associates the return address transmitted from the print server with the OK button 806. Then, in step S1205, the UI display module 402 transmits the created UI to the client computer 102, and in SQ1007, presents the UI to the user.

In SQ1008, based on the presented UI, the user sets the print setting information, presses the OK button 806, and then the client computer 102 transmits the print setting information to the print server 103.

In step S1107, the print server 103 receives the information transmitted from the client computer 102. In step S1108, the print server 103 determines the module corresponding to the return address, and in the next step, executes the module corresponding to the return address.

If the module corresponding to the return address is the print execution module 203 (PRINT in step S1108), in step S1109, the print server 103 executes the print execution module 203. In step S1110, based on the print setting information transmitted from the client computer 102, the print execution module 203 converts the print target file and the print setting information into a page description language that can be interpreted by the printer 105 via the page description language conversion module. Specifically, print data is generated based on the processing of step S1110.

In step S1111, the print execution module 203 transmits the print data information converted into a page description language to the client computer 102 via the print data transmission module 206.

In SQ1009, the print execution module 203 redirects so that an instruction for pull-printing the target print data by the target printer 105 is transmitted to the printer 105 via the client computer 102.

Then, in SQ1010, based on the transmitted print data information, the printer 105 communicates with the print server 103. In step S1011, the printer 105 receives the print data, and in step S1112, interprets and outputs the target print data.

On the other hand, if the module corresponding to the return address is the print setting change module 207, the print server 103 executes the print setting change module 207. In step S1113, the print setting change module 207 updates the value of the user data 209 based on the print setting information transmitted from the client computer 102.

Figure 14:
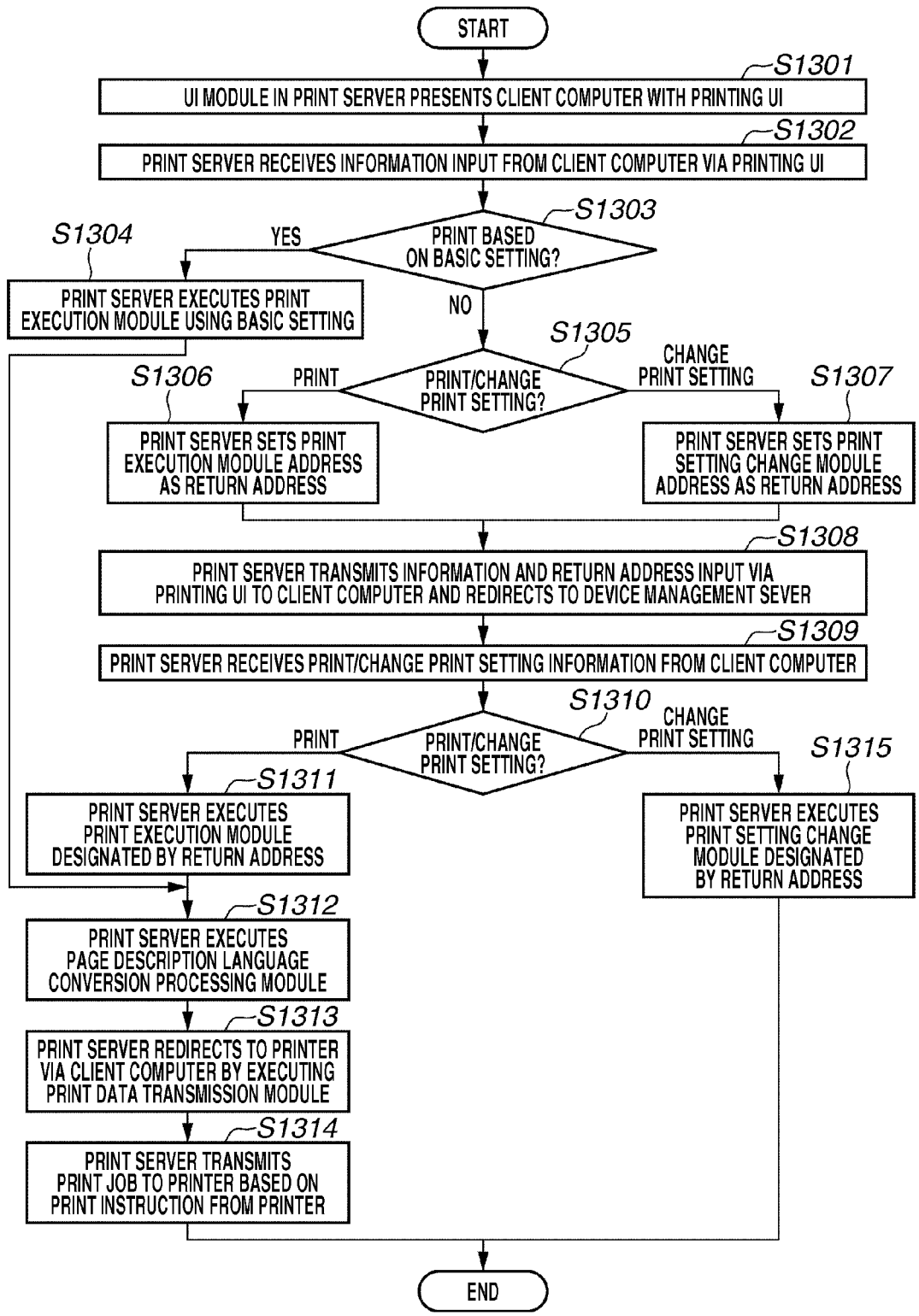
FIG. 14 is a flowchart illustrating an example of processing performed by the print server during a redirect according to a second exemplary embodiment.

A second exemplary embodiment that uses the similar method to that of the first exemplary embodiment will now be described. A flow of the processing performed by the print server according to the present exemplary embodiment is illustrated in FIG. 14, which is an example of the processing performed by the print server 103 during a redirect according to the second exemplary embodiment.

Figure 15:
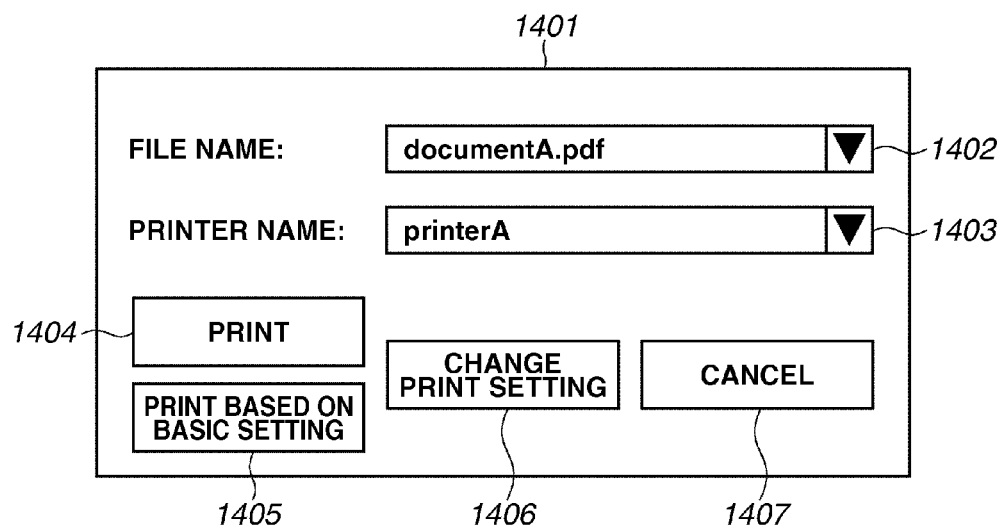
FIG. 15 illustrates an example of a screen displayed by the UI control module according to the second exemplary embodiment.

In step S1301, when the client computer 102 accesses the print server 103, the UI control module 202 in the print server 103 presents the UI illustrated in FIG. 15 on the client computer 102.

FIG. 15 illustrates an example of a screen displayed on the client computer 102 by the UI control module 202 according to the second exemplary embodiment.

The user selects the data to be printed from the print target file (1402 in FIG. 15), selects the target printer from the registered printer list (1403 in FIG. 15), and presses a print button 1404, a basic setting print button 1405, or a print setting change button 1406. Consequently, the client computer 102 transmits information to the print server 103. In step S1302, the print server 103 receives this information.

Next, in step S1303, the print server 103 determines whether the basic setting print button 1405 is pressed. If it is determined that the basic setting print button 1405 is pressed (YES in step S1303), in step S1304, the print server 103 executes the print execution module using basic setting information.

The term "basic setting information" means the default printing setting information that does not include setting items that rely on the printer settings. More specifically, basic setting information is setting information that any printer can execute. In this case, the printing processing can be simplified by skipping the communication between the print server 103 and the device management server 104, and the processing for changing the print setting information.

Since the processing that is performed when the print button 1404 or the print setting change button 1406 is pressed is the same as described in the first exemplary embodiment, a description thereof will be omitted here.

Further, although a flow of the processing when performing a redirect by the client computer 102 is illustrated in FIG. 14, depending on the network environment, a redirect may not need to be performed.

A third exemplary embodiment that uses the similar method to that of the first exemplary embodiment will now be described.

Depending on the situation of the print server 103 and the device management server 104 with the printer 105, the printers that are registered in the print server 103 may not be registered in the device management server 104. In some cases, there may be a printer that is registered in the print server 103 but not in the device management server 104. The present exemplary embodiment is an example that assumes such an environment.

Figure 16:
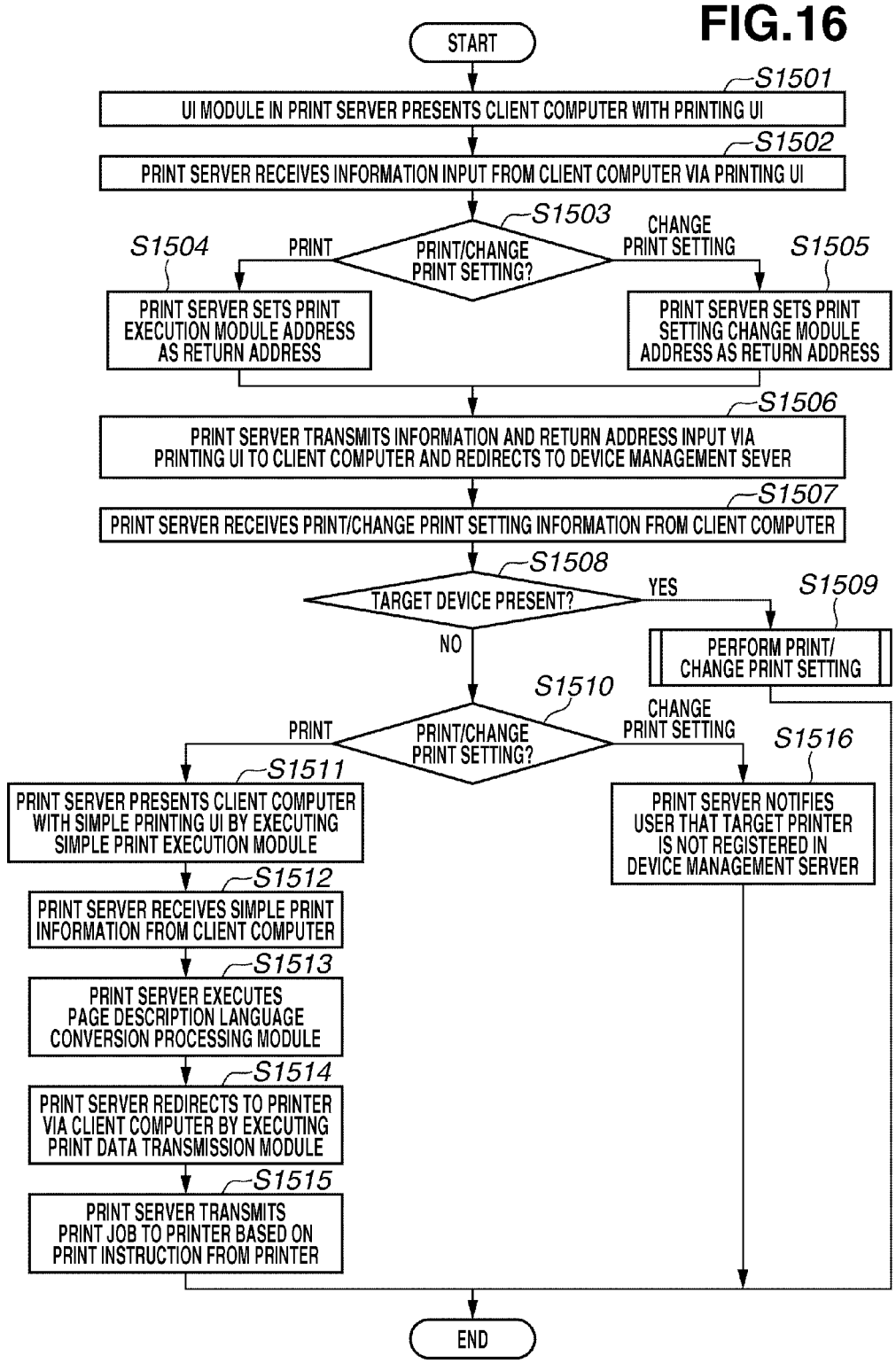
FIG. 16 is a flowchart illustrating an example of processing performed by the print server during a redirect according to a third exemplary embodiment.
Figure 17:
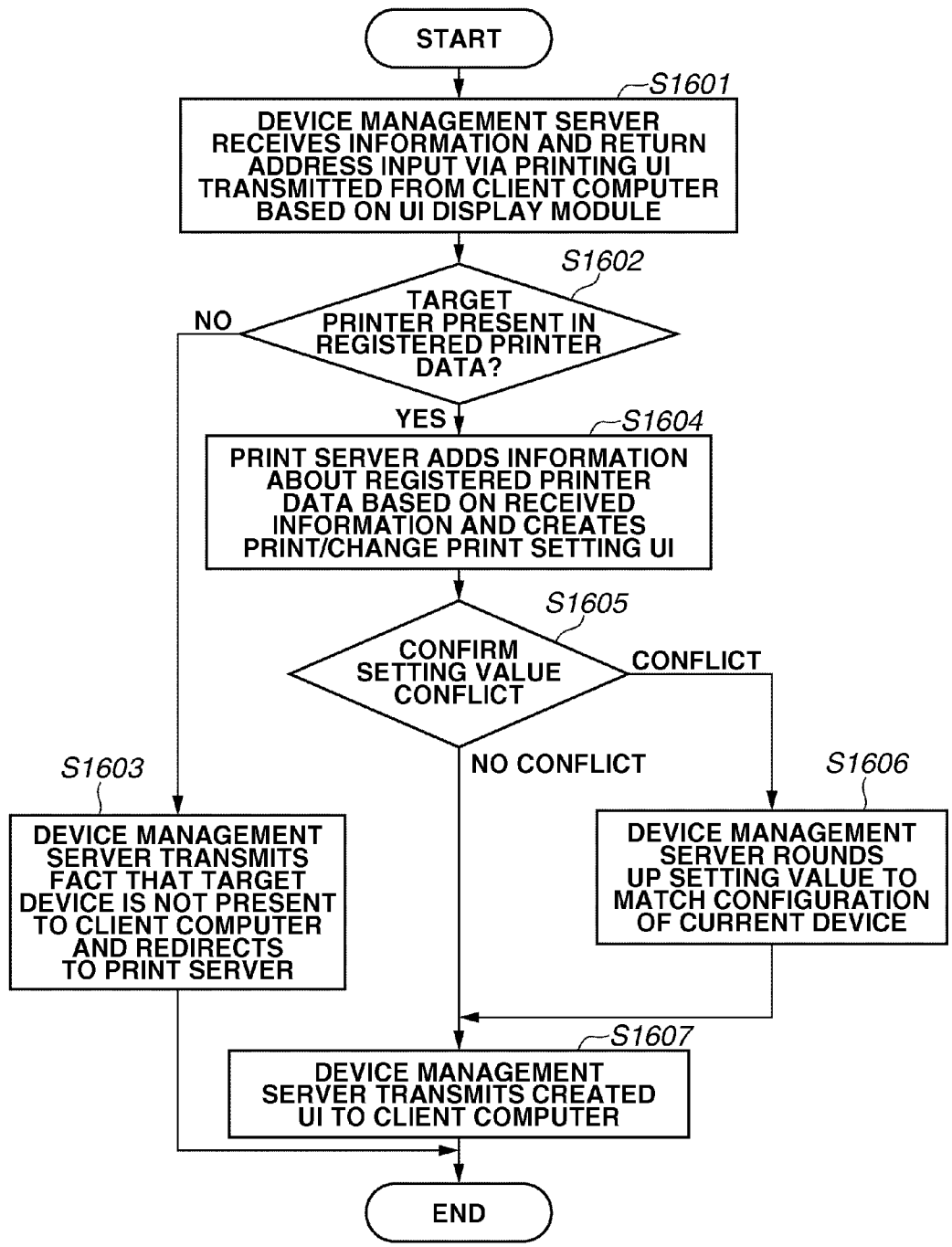
FIG. 17 is a flowchart illustrating an example of processing performed by the device management server according to the third exemplary embodiment.

A flow of the processing performed by the print server 103 according to the present exemplary embodiment is illustrated in FIG. 16, and a flow of the processing performed by the device management server 104 according to the present exemplary embodiment is illustrated in FIG. 17. FIG. 16 is a flowchart illustrating an example of the processing performed by the print server 103 during a redirect according to the third exemplary embodiment. FIG. 17 is a flowchart illustrating an example of the processing performed by the device management server 104 according to the third exemplary embodiment.

Regarding the flow of the processing performed by the print server 103, from steps S1501 to S1507, this flow is the same as that in the first exemplary embodiment. Regarding the flow of the processing performed by the device management server 104, in step S1103, the device management server 104 determines whether the target device included in the information transmitted from the print server 103 is present in the registered printer data 405. If it is determined that the target device is not present in the registered printer data 405 (NO in step S1103), the device management server 104 transmits the information indicating that the target device is not present to the client computer, and in step S1104, redirects to the print server.

In step S1508, the print server 103 determines whether the information transmitted from the device management server 104 via the client computer 102 includes information indicating that the target device is not registered in the device management server 104. If it is determined that the target device is registered in the device management server 104 (YES in step S1508), in step S1509, the print server 103 executes printing or changes the print setting in the same manner as in the first exemplary embodiment. The processing performed in step S1509 corresponds to the processing from steps S1103 to S1113 in FIG. 12.

On the other hand, if it is determined that the target device is not registered in the device management server 104 (NO in step S1508), in step S1510, the print server 103 determines the module corresponding to the return address included in the information transmitted from the device management server 104 via the client computer 102.

Figure 18:
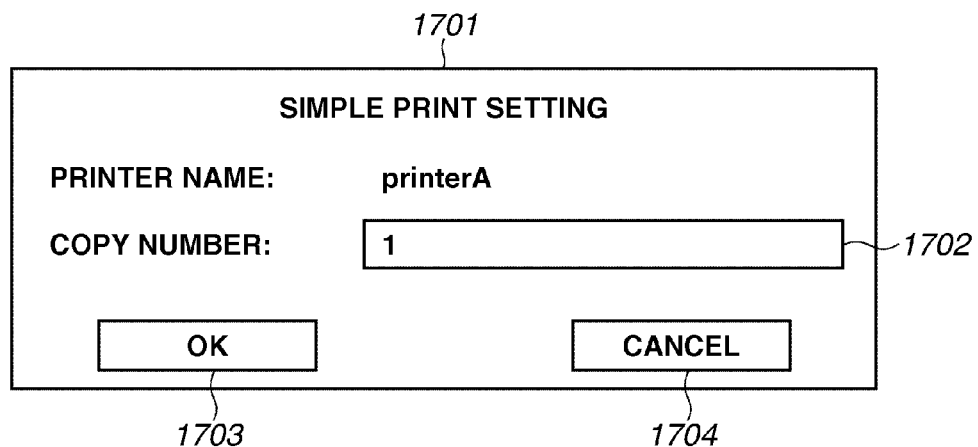
FIG. 18 illustrates an example of a simple print setting screen displayed by a simple print execution module.

If the module corresponding to the return address is the print execution module 203, the print server 103 executes the simple print execution module 204. In step S1511, the print server 103 presents the UI illustrated in FIG. 18, which only has setting items that do not depend on the type or configuration of a printer, on the client computer 102 created by the simple print execution module 204.

Based on the presented UI, the user sets the print setting, presses an OK button 1703, and then the client computer 102 transmits the print setting information to the print server 103.

In step S1512, the print server 103 receives the information transmitted from the client computer 102. In step S1513, based on the print setting information transmitted from the client computer 102, the simple print execution module 204 converts the print target file and the print setting information into a page description language that can be interpreted by the printer via the page description language conversion module.

Then, in step S1514, the simple print execution module 204 transmits the print data information converted into a page description language to the client computer 102 via the print data transmission module 206.

The simple print execution module 204 redirects so that an instruction for pull-printing the target print data by the target printer is transmitted to the printer 105 via the client computer 102.

Then, in step S1515, based on the transmitted print data information, the printer 105 interprets and outputs the target print data by communicating with the print server 103. On the other hand, if the module corresponding to the return address is the print setting change module 207, in step S1516, the print server 103 notifies the user of the fact that the target device is not registered in the device management server.

Although a flow of the processing when performing a redirect by the client computer 102 is illustrated in FIGS. 16 and 17, depending on the network environment, a redirect may not need to be performed.

A fourth exemplary embodiment that uses similar method to that of the first exemplary embodiment will now be described.

In the UI provided by the device management server 104, when the user changes the print setting information on the client computer 102, the user may set print setting information that cannot be realized by the target printer. Specifically, the present exemplary embodiment assumes a case in which the user sets both OHP paper and two-sided printing.

The present exemplary embodiment is an example in which, to resolve this problem, the device management server 104 confirms whether there is a conflict in the print setting information changed by the user.

Figure 19:
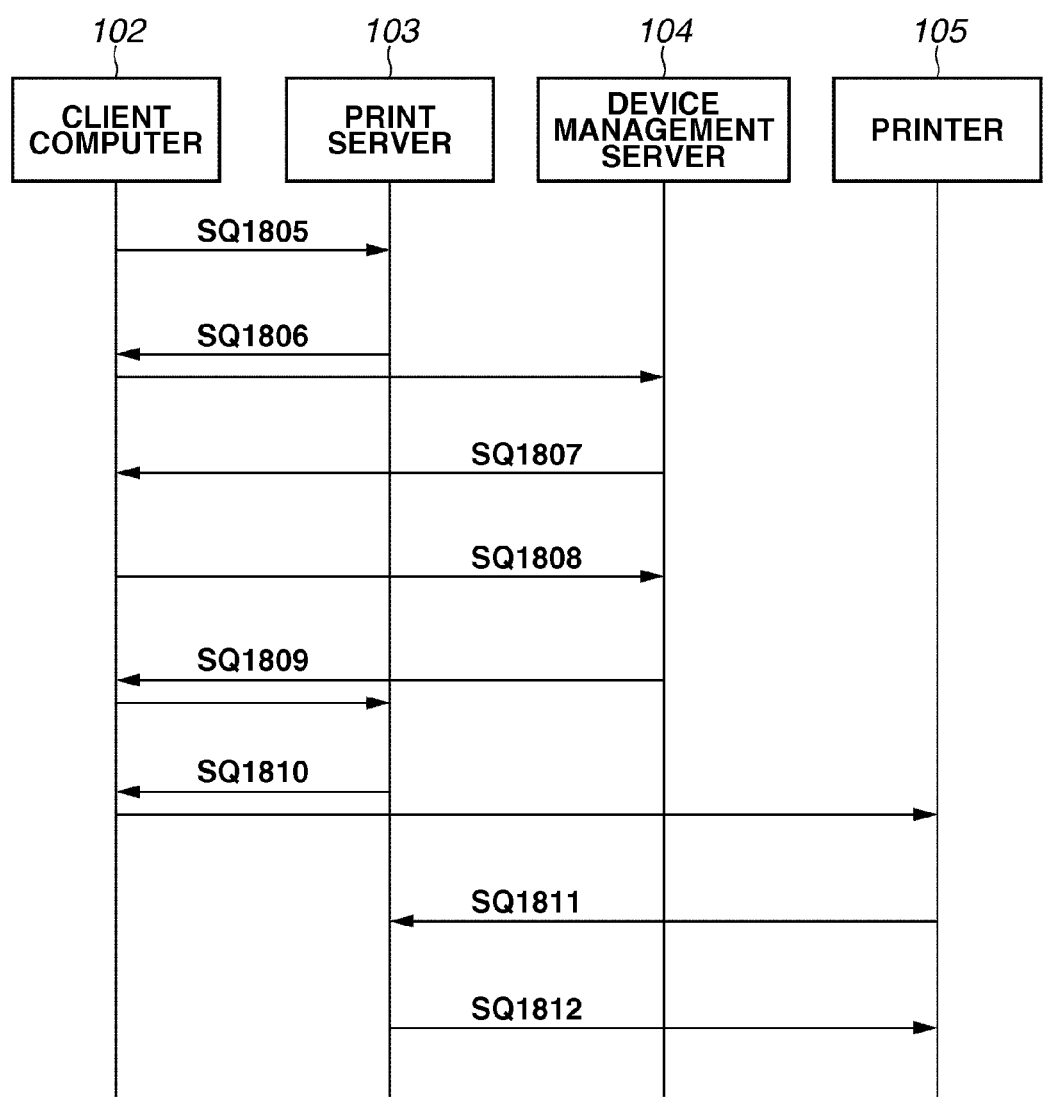
FIG. 19 illustrates an example of a print processing sequence according to a fourth exemplary embodiment.

A sequence when printing and setting the print setting information according to the present exemplary embodiment is illustrated in FIG. 19, and a flow of the processing performed by the device management server according to the present exemplary embodiment is illustrated in FIG. 20. FIG. 19 illustrates an example of a print processing sequence according to the fourth exemplary embodiment. FIG. 20 is a flowchart illustrating an example of the processing performed by the device management server 104 according to the fourth exemplary embodiment.

Other than the processing performed by the user to change the print setting via the client computer 102, since the processing in the fourth exemplary embodiment is similar to that performed in the first exemplary embodiment, a description thereof will be omitted here.

In SQ1808, based on the presented UI, the user sets the print setting information, presses the OK button, and then the client computer 102 transmits the print setting information to the device management server 104.

In step S1906, the device management server 104 receives that information. Then, in step S1907, the device management server 104 determines whether that setting value can be realized by the target printer.

If it is determined that an unrealizable setting item is present (CONFLICT in step S1907), in step S1908, the device management server 104 notifies the user of the fact to prevent such print setting information from being transmitted to the print server 103.

Although a flow of the processing when performing a redirect by the client computer was illustrated in FIGS. 19 and 20, depending on the network environment, a redirect may not need to be performed.

The present invention can also be realized by supplying software (a program) for realizing the functions of the above exemplary embodiments to a system or an apparatus via a network or via various storage media, and having a computer (or a CPU, a micro processing unit (MPU), and/or the like) of the system or apparatus read and execute the program.

According to the above-described exemplary embodiments, for example, the print server apparatus can provide a client apparatus with a screen for setting an appropriate print setting based on configuration data relating to the configuration of the printing device, even when the configuration data is not stored in the print server apparatus.

Although preferred exemplary embodiments of the present invention were described above, the present invention is not limited to these. Various modifications and changes can be made within the gist of the invention described in the scope of the claims.

For example, the function of the device management server 104 may be included in the image forming apparatus (or the printer 105). Further, in the exemplary embodiments, although there are only one print server 103 and one device management server 104, to disperse the load, a plurality of machines (apparatuses) may be clustered together.

Moreover, the printing processing and the print setting change processing are an example of information processing. According to the present invention, for example, the print server apparatus can provide a client apparatus with a screen for setting an appropriate print setting based on configuration data relating to the configuration of the printing device, even when the configuration data is not stored in the print server apparatus.

Aspects of the present invention can also be realized by a computer of a system or apparatus (or devices such as a CPU, MPU, and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-163239 filed Jul. 20, 2010, which is hereby incorporated by reference herein in its entirety.

What is claimed is:

1. A printing system comprising a print server having a plurality of service provision units configured to provide printing-related services, a device management server configured to manage configuration data relating to a configuration of a plurality of printing devices, and a client personal computer (PC), wherein the print server comprises a first transmission unit configured to, when a print instruction that includes setting identification information that identifies print setting data, and printing device identification information that identifies a printing device is received from the client PC, transmit to the device management server the print setting data identified based on the setting identification information, the printing device identification information, and first address information indicating an address of a first service provision unit which executes the print instruction, and when a setting change instruction that includes setting identification information that identifies print setting data, and printing device identification information that identifies a printing device is received, transmit to the device management server the print setting data identified based on the setting identification information, the printing device identification information, and second address information indicating an address of a second service provision unit which executes the setting change instruction, wherein the device management server comprises a creation unit configured to, when the device management server apparatus receives the print setting data, the printing device identification information, and the first address information, create a screen for setting print setting information of a function that can be executed by the printing device based on configuration data about the printing device identified based on the printing device identification information and the print setting data, an association unit configured to, when the first address information is received, associate the first address information with a predetermined object to instruct print processing included in the screen, and when the second address information is received, associate the second address information with the predetermined object, and a second transmission unit configured to transmit the screen where the predetermined object is associated with the first address information or the second address information to the client PC, wherein the client PC comprises a transmitting unit configured to transmit print setting information input via the screen to the print server, wherein the print server further comprises a processing unit configured to, if the predetermined object on the screen is associated with the first address information, process the print setting information using the first service provision unit corresponding to the first address information, and if the predetermined object on the screen is associated with the second address information, process the print setting information using the second service provision unit corresponding to the second address information, and wherein the first service provision unit indicated by the first address information and the second service provision unit indicated by the second address information exist in the print server.

2. A method for processing information in a printing system comprising a print server having a plurality of service provision units configured to provide printing-related services, a device management server configured to manage configuration data relating to a configuration of a plurality of printing devices, and a client personal computer (PC), wherein the method comprises:

when a print instruction that includes setting identification information that identifies print setting data, and printing device identification information that identifies a printing device is received from the client PC, transmitting to the device management server the print setting data identified based on the setting identification information, the printing device identification information, and first address information indicating an address of a first service provision unit which executes the print instruction, and when a setting change instruction that includes setting identification information that identifies print setting data, and printing device identification information that identifies a printing device is received, transmitting to the device management server the print setting data identified based on the setting identification information, the printing device identification information, and second address information indicating an address of a second service provision unit which executes the setting change instruction, when the device management server receives the print setting data, the printing device identification information, and the first address information, creating a screen for setting print setting information of a function that can be executed by the printing device based on configuration data about the printing device identified based on the printing device identification information and the print setting data, when the first address information is received, associating the first address information with a predetermined object to instruct print processing included in the screen, and when the second address information is received, associating the second address information with the predetermined object, and transmitting the screen where the predetermined object is associated with the first address information or the second address information to the client PC, wherein the client PC comprises a transmitting unit configured to transmit print setting information input via the screen to the print server, wherein the print server further comprises a processing unit configured to, if the predetermined object on the screen is associated with the first address information, process the print setting information using the first service provision unit corresponding to the first address information, and if the predetermined object on the screen is associated with the second address information, process the print setting information using the second service provision unit corresponding to the second address information, and wherein the first service provision unit indicated by the first address information and the second service provision unit indicated by the second address information exist in the print server.

3. A device management server configured to manage configuration data relating to a configuration of a printing device, the server comprising:

a creation unit configured to create a screen for setting print setting information about a function that can be executed by the printing device based on printing device configuration data and print setting data that identifies the print setting data; and an association unit configured to, when first address information indicating an address of a first service provision unit that provides a printing-related service is received, associate the first address information with a predetermined object to instruct print processing included in a screen created by the creation unit, and when second address information indicating an address of a second service provision unit that provides a printing-related service is received, associate the second address information with the predetermined object.

4. An information processing method executed by a device management server configured to manage configuration data relating to a configuration of a printing device, the method comprising:

creating a screen for setting print setting information about a function that can be executed by the printing device based on printing device configuration data and print setting data that identifies the print setting data; and when first address information of a first service provision unit that provides a printing-related service is received, associating the first address information with a predetermined object to instruct print processing included in the created screen, and when second address information indicating an address of a second service provision unit that provides a printing-related service is received, associating the second address information with the predetermined object.

5. A non-transitory computer-readable storage medium storing computer-executable instructions for causing a computer, when executed, which manages configuration data relating to a configuration of a printing device, to perform a method comprising:

creating a screen for setting print setting information about a function that can be executed by the printing device based on printing device configuration data and print setting data that identifies the print setting data; and when first address information of a first service provision unit that provides a printing-related service is received, associating the first address information with a predetermined object to instruct print processing included in the created screen, and when second address information indicating an address of a second service provision unit that provides a printing-related service is received, associating the second address information with the predetermined object.

* * * * *